United States Patent
Kilchyk et al.

(10) Patent No.: US 12,546,327 B1
(45) Date of Patent: Feb. 10, 2026

(54) AIR CYCLE MACHINE WITH AXIAL ROTORS AND INTEGRATED CABIN AIR COMPRESSOR

(71) Applicant: Hamilton Sundstrand Corporation, Charlotte, NC (US)

(72) Inventors: Viktor Kilchyk, Williamsville, NY (US); Brent J. Merritt, Southwick, MA (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 18/797,949

(22) Filed: Aug. 8, 2024

(51) Int. Cl.
| | |
|---|---|
| F04D 25/08 | (2006.01) |
| B64D 13/02 | (2006.01) |
| B64D 13/06 | (2006.01) |
| F04D 25/02 | (2006.01) |

(52) U.S. Cl.
CPC ........... F04D 25/082 (2013.01); B64D 13/02 (2013.01); F04D 25/024 (2013.01); *B64D 2013/0648* (2013.01)

(58) Field of Classification Search
CPC ............... B64D 13/02; B64D 13/06; B64D 2013/0644; B64D 2013/0648; F01D 15/10; F04D 25/024
See application file for complete search history.

(56) References Cited

U.S. PATENT DOCUMENTS

| | | | |
|---|---|---|---|
| 4,967,565 A * | 11/1990 | Thomson | B64D 13/06 62/57 |
| RE36,101 E | 2/1999 | Andres et al. | |
| 8,418,495 B2 | 4/2013 | Merritt et al. | |
| 10,526,092 B2 | 1/2020 | Defrancesco | |
| 11,073,091 B2 | 7/2021 | Johnson et al. | |
| 11,371,379 B2 * | 6/2022 | van der Merwe | F02C 3/107 |
| 11,566,533 B2 * | 1/2023 | Czarnik | F02C 7/06 |
| 11,680,486 B2 * | 6/2023 | Palmer | F01D 25/36 416/128 |
| 11,897,618 B2 | 2/2024 | Merritt et al. | |
| 2009/0084896 A1 * | 4/2009 | Boucher | B64D 13/08 454/76 |
| 2016/0160867 A1 * | 6/2016 | Gehlot | F02C 7/36 60/805 |
| 2020/0123923 A1 * | 4/2020 | Eckett | F02C 6/08 |
| 2020/0216180 A1 * | 7/2020 | Szillat | F02C 6/08 |
| 2021/0324802 A1 * | 10/2021 | Bonnoitt | F02C 7/32 |
| 2024/0060499 A1 | 2/2024 | Kilchyk et al. | |
| 2024/0060500 A1 | 2/2024 | Merritt et al. | |
| 2024/0183281 A1 | 6/2024 | Kilchyk et al. | |

* cited by examiner

*Primary Examiner* — Courtney D Heinle
*Assistant Examiner* — Cameron A Corday
(74) *Attorney, Agent, or Firm* — CANTOR COLBURN LLP

(57) ABSTRACT

An ACM having a motor with front and aft ends; a compressor coupled to the front end; a turbine coupled to the aft end; a shell having a shell front part that surrounds the compressor and defines a shell inlet, a shell aft part that surrounds the turbine and defines a shell outlet, and a shell middle part that surrounds the motor; an outer flow passage is defined within the shell, surrounding the compressor, the motor and the turbine; a shaft extends between the compressor and turbine to define a shaft front end coupled to the compressor, and a shaft aft end coupled to the turbine, and the motor includes a rotor that is mounted to the shaft.

17 Claims, 5 Drawing Sheets

ABSTRACT
AIR CYCLE MACHINE WITH AXIAL ROTORS AND INTEGRATED CABIN AIR COMPRESSOR

BACKGROUND

The embodiments are directed to an environmental control system (ECS) of an aircraft and more specifically to an air cycle machine (ACM) with axial rotors and an integrated cabin air compressor (CAC).

An ECS for an aircraft may have an ACM, which includes various components, including a turbine and compressor that are operationally coupled to each other, a heat exchanger between the turbine and the compressor to condition the air before entering the turbine, and piping extending between the components. The ACM may not require a motor because it may run off high pressure engine bleed air. The ECS also may have a CAC, which also includes various components, including another compressor and turbine operationally coupled to each other via a motor, another heat exchanger between the CAC turbine and the CAC compressor to condition the air before entering the CAC turbine, and additional piping extending between these components and between the ACM and the CAC. The CAC motor may be utilized, for example, when the aircraft is on the ground and the engines are not running so that flow through the ECS is insufficient to power the CAC. Considerations related to utilizing these components include spatial requirements, a configuration of the piping, and inefficiencies separately introduced into the ECS by each of the components. Traditional ACM configurations have a complex ducting and valve arrangement between the heat exchanger and rotor stages. This configuration may result in a considerable weight and size penalty.

BRIEF SUMMARY

Disclosed is an air cycle machine (ACM), including a motor having a front end and an aft end; a compressor coupled to the front end of the motor; a turbine coupled to the aft end of the motor; a shell having a shell front part that surrounds the compressor and defines a shell inlet, a shell aft part that surrounds the turbine and defines a shell outlet, and a shell middle part that surrounds the motor, wherein an outer flow passage is defined within the shell, surrounding the compressor, the motor and the turbine; a shaft extending between the compressor and the turbine to define a shaft front end that is coupled to the compressor, and a shaft aft end that is coupled to the turbine; and the motor includes a rotor that is mounted to the shaft.

In addition to one or more aspects of the ACM, or as an alternate, the compressor is an axial compressor.

In addition to one or more aspects of the ACM, or as an alternate, the turbine is an axial turbine.

In addition to one or more aspects of the ACM, or as an alternate, the turbine includes a turbine high pressure stage and a turbine low pressure stage that is aft of the turbine high pressure stage.

In addition to one or more aspects of the ACM, or as an alternate, the compressor includes a compressor low pressure stage and a compressor high pressure stage that is aft of the compressor low pressure stage.

In addition to one or more aspects of the ACM, or as an alternate, the compressor low pressure stage is a cabin air compressor.

In addition to one or more aspects of the ACM, or as an alternate, the shell front part has a first forward portion surrounding the compressor low pressure stage and a first aft portion surrounding the compressor high pressure stage.

In addition to one or more aspects of the ACM, or as an alternate, the first forward portion of the shell front part diverges toward the first aft portion of the shell front part.

In addition to one or more aspects of the ACM, or as an alternate, the first aft portion of the shell front part converges toward the shell middle part.

In addition to one or more aspects of the ACM, or as an alternate, the shell aft part has a second front portion surrounding the turbine high pressure stage and a second aft portion surrounding the turbine low pressure stage.

In addition to one or more aspects of the ACM, or as an alternate, the second forward portion of the shell aft part diverges toward the aft portion of the shell aft part.

In addition to one or more aspects of the ACM, or as an alternate, the second aft portion of the shell aft part converges aft of the front portion of the shell aft part.

In addition to one or more aspects of the ACM, or as an alternate: the motor has a motor case that includes a first front conical end that diverges aft of the shell front part, a first aft conical end that converges aft toward the shell aft part, and first middle portion that is cylindrical; and the shell middle part has a second front conical end that diverges around the first front conical end of the motor case, a second aft conical end that converges around the first aft conical end of the motor case, and a second middle portion disposed around the first middle portion of the motor case and is cylindrical.

In addition to one or more aspects of the ACM, or as an alternate, the shaft is a hollow shaft and defines and a shaft passage extending between the shaft front and aft ends; the shaft aft end defines a shaft inlet and the shaft front end defines a shaft outlet; and the shaft provides for backflow from the turbine to the compressor, via the shaft inlet and outlet, for cooling of the motor.

In addition to one or more aspects of the ACM, or as an alternate, the shaft inlet is an axial aperture.

In addition to one or more aspects of the ACM, or as an alternate, the shaft outlet is an axial aperture.

In addition to one or more aspects of the ACM, or as an alternate, the turbine comprises a turbine high pressure stage and a turbine low pressure stage that is aft of the turbine high pressure stage; and the shaft inlet is a radial aperture disposed at the turbine low pressure stage.

In addition to one or more aspects of the ACM, or as an alternate, the shell, end to end, is formed of two unitary half-shell members, coupled to each other by one or more of hinges and fasteners.

Disclosed is an air cycle machine (ACM), including a motor having a front end and an aft end; a compressor coupled to the front end of the motor; a turbine coupled to the aft end of the motor; a shell having a shell front part that surrounds the compressor and defines a shell inlet, a shell aft part that surrounds the turbine and defines a shell outlet, and a shell middle part that surrounds the motor, wherein an outer flow passage is defined within the shell, surrounding the compressor, the motor and the turbine; and a hollow shaft extending between the compressor and the turbine to define a shaft front end that is coupled to the compressor, a shaft aft end that is coupled to the turbine, and a shaft passage extending between the shaft front and aft ends, wherein the shaft aft end defines a shaft inlet and the shaft front end defines a shaft outlet, and wherein the shaft provides for backflow from the turbine to the compressor, via the shaft inlet and outlet, for cooling of the motor, and wherein the shell, end to end, is formed of two unitary half-shell members that are connected to each other by one or more of hinges and fasteners.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
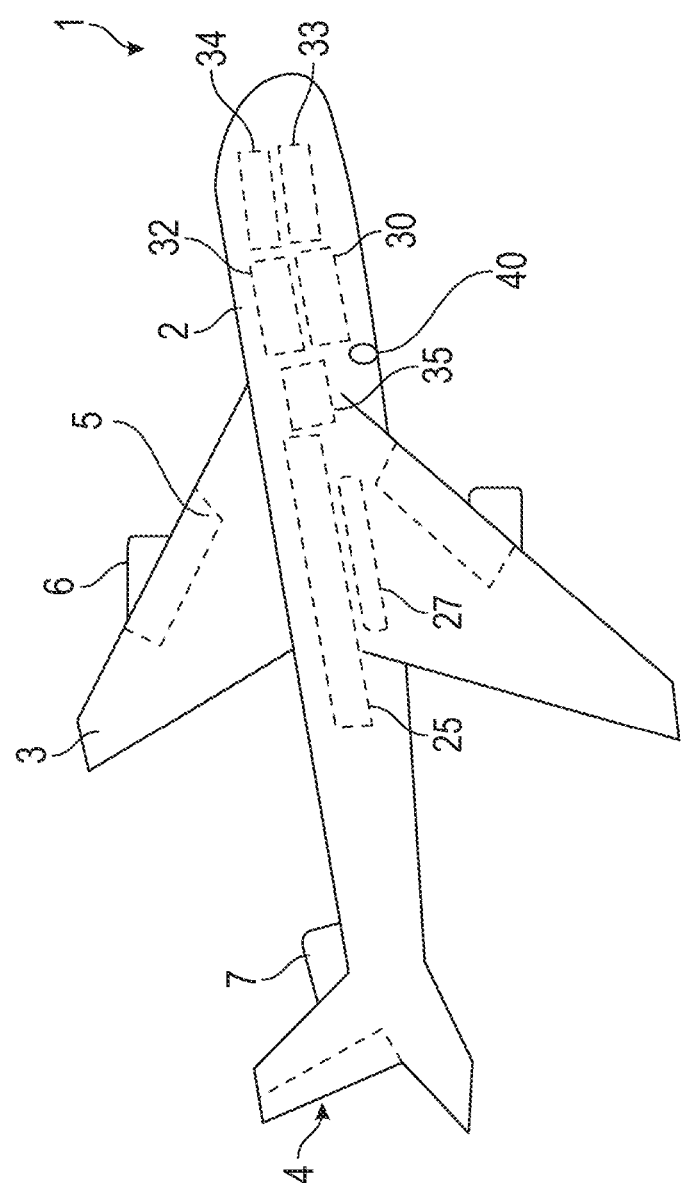
FIG. 1 shows an aircraft that may utilize aspects of the disclosed embodiments.

FIG. 1 shows an aircraft 1 having a fuselage 2 with a wing 3 and tail assembly 4, which may have control surfaces 5. The wing 3 may include an engine 6, such as a gas turbine engine, and an auxiliary power unit 7 may be disposed at the tail assembly 4. The aircraft 1 may have a cabin 25, a cargo bay 27, an environmental control system (ECS) 30 for conditioning the cabin 25 and/or cargo bay 27. The ECS 30 may include a vapor compression system (VCS) 32 that cools air directed to, e.g., the cargo bay 27 and provides refrigeration to one or more systems 35 of the aircraft 1, and an air cycle machine (ACM) 33 that cools air directed to e.g., the cabin 25. A RAM air inlet 40 may scoop air for the ECS 30, or the ECS 30 may receive air recirculated from, e.g., a cabin air compressor (CAC) 34.

Figure 2:
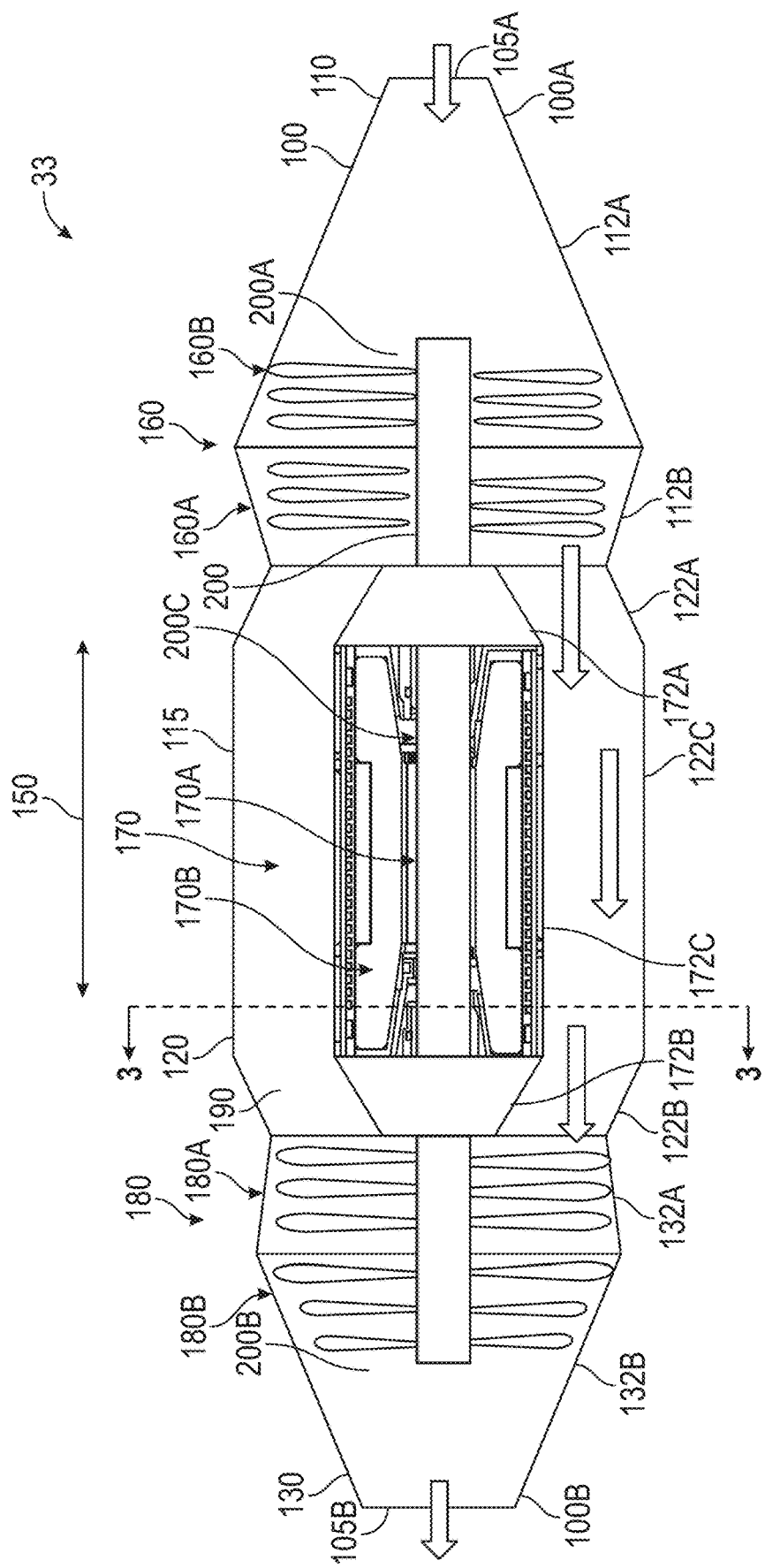
FIG. 2 shows an ACM according to an embodiment that has a compressor, a motor and a turbine within a unitary housing.

Turning to FIG. 2, an ACM 33 is shown for the ECS 30 of the aircraft 1. The ACM 33 includes a shell 100. The shell 100 has a shell front part 110 that defines a shell inlet 105A, a shell middle part 120 and a shell aft part 130 that defines a shell outlet 105B. That is, the shell parts (generally referred as 115) are distributed along an axial centerline 150.

A compressor 160 is located in the shell front part 110. In one embodiment, the compressor 160 is an axial compressor. The compressor 160 includes a low pressure stage (or low pressure compressor) 160A and a high pressure stage (or high pressure compressor) 160B that is aft of the low pressure stage 160A. The low pressure stage 160A may be a CAC (shown as CAC 34 in FIG. 1)

A motor 170 is located in the shell middle part 120. The motor 170 may include a rotor 170A, which may include permanent magnets. The motor 170 may include a stator 170B that is exterior to the rotor 170A and may include coil windings.

A turbine 180 is in the shell aft part 130. In one embodiment, the turbine 180 is an axial turbine 180. The turbine 180 may include a high pressure stage (or high pressure turbine) 180A and a low pressure stage (or low pressure turbine) 180B that is aft of the high pressure stage 180A.

An outer flow passage 190 is defined within the shell 100, surrounding the compressor 160, the motor 170 and the turbine 180. A shaft 200 extends between the compressor 160 and turbine 180 to define a shaft front part 200A, a shaft aft part 200B and a shaft middle part 200C. The shaft 200 couples the compressor 160, the motor 170 and the turbine 180. That is, the compressor 160, the motor 170 and the turbine are mounted to the shaft front part 200A, the shaft intermediate section 200C and the shaft aft part 200B.

In one embodiment, the shell front part 110 has a first front portion 112A surrounding the low pressure stage 160A of the compressor 160 and a first aft portion 112B surrounding the high pressure stage 160B of the compressor 160. The first front portion 112A of the shell front part 110 diverges toward the first aft portion 112B of the shell front part 110. The first aft portion 112B of the shell front part 110 converges toward the shell middle part 120.

In one embodiment, the shell aft part 130 has a second front portion 132A surrounding the high pressure stage 180A of the turbine 180 and a second aft portion 132B surrounding the low pressure stage of the turbine 180. The second front portion 132A of the shell aft part 130 diverges toward the second aft portion 132B of the shell aft part 130. The second aft portion 132B of the shell aft part 130 converges aft of the second front portion 132A of the shell aft part 130. With this configuration, the shell 100 converges at both axial ends 100A, 100B.

In one embodiment, the motor 170 has a motor case 172 that includes a first front conical end 172A that diverges aft from the shell front part 110, and a first aft conical end 172B that converges aft toward the shell aft part 130. The motor case 172 has a first middle portion 172C between the first front and aft conical ends 172A, 172B, that is cylindrical.

In one embodiment, the shell middle part 120 has a second front conical end 122A that diverges around the first front conical end 172A of the motor case 172, and a second aft conical end 122B that converges around the first aft conical end 172B of the motor case 170. The shell middle part 120 has a second middle part 122C that is cylindrical and surrounds the first middle portion of the motor case 170.

The identified contours of the shell 100 and the motor case 172 provide for desired airflow dynamics through the ACM 33 and between the compressor 160, the motor 17 and the turbine 180.

Figure 3:
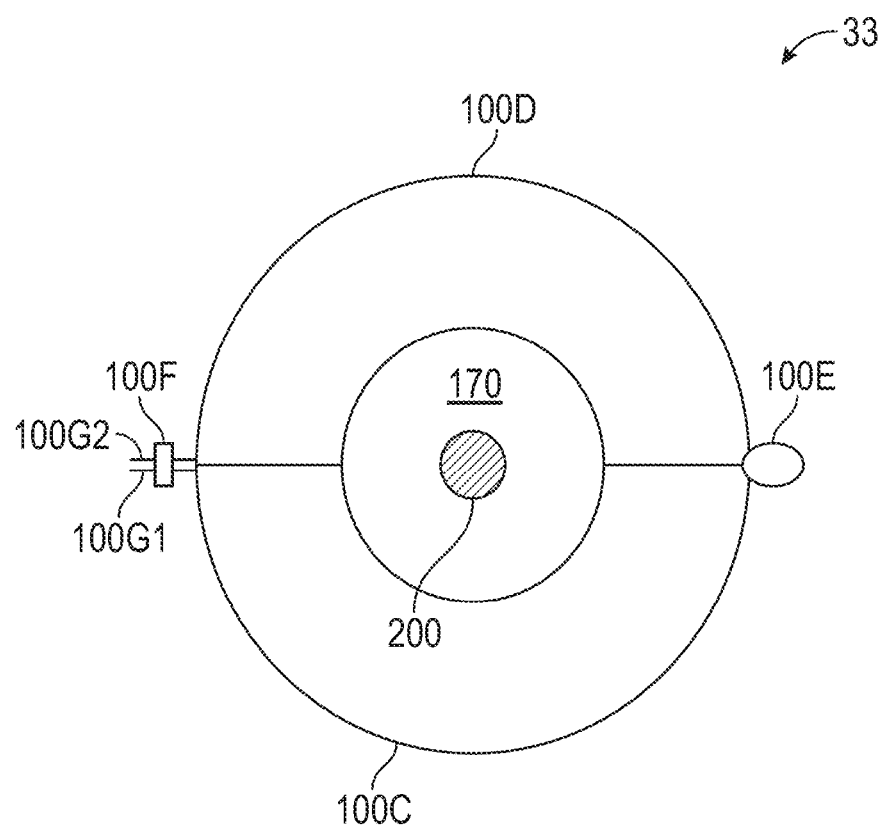
FIG. 3 is a cross section of the ACM along lines 3-3 in FIG. 2 and shows segments of a shell surrounding the ACM according to an embodiment.

As shown in FIG. 3, the outer shell 100, end to end, may be formed of two unitary half-shell members 100C, 100D. The half-shell members 100C, 100D may be additively manufactured and coupled to each other by one or more of hinges 100E and fasteners 100F, e.g., securing flanges 100G1, 100G2 formed on mate-faces of the half-shell members 100C, 100D. Components of the ACM 33, such as the heat motor 170 and the shaft 200 shown in FIG. 2, may be installed and within the shell halves, which may then be closed around the components. The shell halves 100C, 100D may be later opened to service the components.

Figure 4:
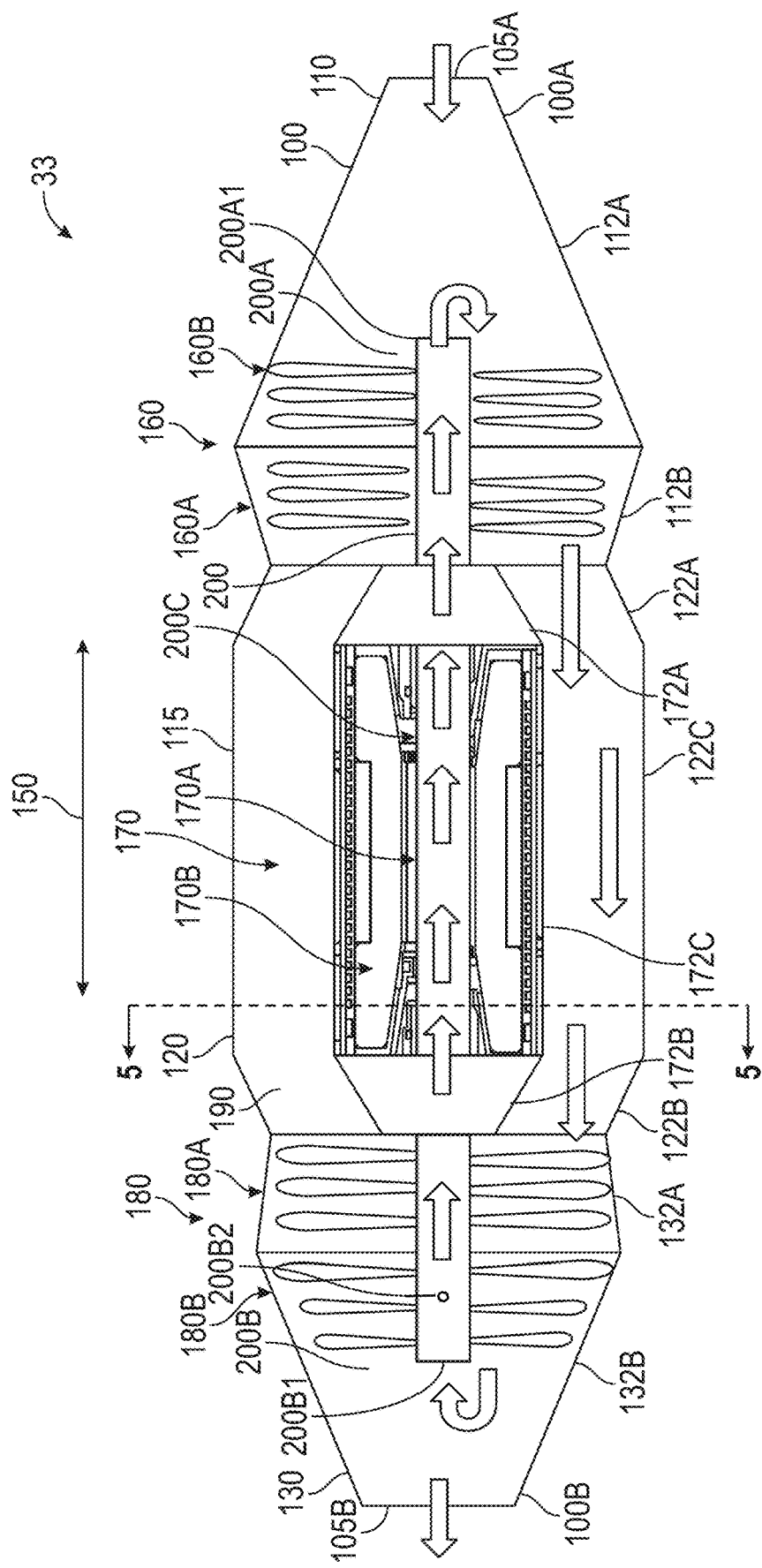
FIG. 4 shows an ACM according to an embodiment that differs from the configuration of FIG. 2 by utilizing center cooling of the motor.

Turning to FIG. 4, an ACM 33 is shown for the ECS 30 of the aircraft 1. The ACM 33 includes a shell 100. The shell 100 has a shell front part 110 that defines a shell inlet 105A, a shell middle part 120 and a shell aft part 130 that defines a shell outlet 105B. That is, the shell parts (generally referred as 115) are distributed along an axial centerline 150.

A compressor 160 is located in the shell front part 110. In one embodiment, the compressor 160 is an axial compressor. The compressor 160 includes a low pressure stage (or low pressure compressor) 160A and a high pressure stage (or high pressure compressor) 160B that is aft of the low pressure stage 160A. The low pressure stage 160A may be a CAC (shown as CAC 34 in FIG. 1)

A motor 170 is located in the shell middle part 120. The motor 170 may include a rotor 170A, which may include permanent magnets. The motor 170 may include a stator 170B that is exterior to the rotor 170A and may include coil windings.

A turbine 180 is in the shell aft part 130. In one embodiment, the turbine 180 is an axial turbine 180. The turbine 180 may include a high pressure stage (or high pressure turbine) 180A and a low pressure stage (or low pressure turbine) 180B that is aft of the high pressure stage 180A.

An outer flow passage 190 is defined within the shell 100, surrounding the compressor 160, the motor 170 and the turbine 180. A hollow shaft 200 extends between the compressor 160 and turbine 180 to define a shaft front part 200A, a shaft aft part 200B and a shaft middle part 200C. The shaft front part 200A defines a shaft outlet 200A1 and the shaft aft part 200B defines a shaft inlet 200B1.

The shaft 200 couples the compressor 160, the motor 170 and the turbine 180. That is, the compressor 160, the motor 170 and the turbine are mounted to the shaft front part 200A, the shaft intermediate section 200C and the shaft aft part 200B. The shaft 200 provides for backflow from the turbine 180 to the compressor 160, via the shaft inlet and outlet 200B1, 200A1, for cooling of the motor 170. That is, the flow through the compressor 160 increases pressure in the flow relative to pressure upstream of the compressor 160. The turbine 180 then cools the high-pressure flow. The cool, high-pressure flow cycles back through the shaft 200 and cools the motor 170.

In one embodiment, the shaft outlet 200A1 is an axial aperture and the shaft inlet 200B1 is also an axial aperture. In one embodiment, the shaft inlet 200B1 is a radial aperture 200B2 disposed along the low pressure stage 180B of the turbine 180, where flow through the shell 100 is the coolest and at a relatively high pressure.

In one embodiment, the shell front part 110 has a first front portion 112A surrounding the low pressure stage 160A of the compressor 160 and a first aft portion 112B surrounding the high pressure stage 160B of the compressor 160. The first front portion 112A of the shell front part 110 diverges toward the first aft portion 112B of the shell front part 110. The first aft portion 112B of the shell front part 110 converges toward the shell middle part 120.

In one embodiment, the shell aft part 130 has a second front portion 132A surrounding the high pressure stage 180A of the turbine 180 and a second aft portion 132B surrounding the low pressure stage of the turbine 180. The second front portion 132A of the shell aft part 130 diverges toward the second aft portion 132B of the shell aft part 130. The second aft portion 132B of the shell aft part 130 converges aft of the second front portion 132A of the shell aft part 130. With this configuration, the shell 100 converges at both axial ends 100A, 100B.

In one embodiment, the motor 170 has a motor case 172 that includes a first front conical end 172A that diverges aft from the shell front part 110, and a first aft conical end 172B that converges aft toward the shell aft part 130. The motor case 172 has a first middle portion 172C between the first front and aft conical ends 172A, 172B, that is cylindrical.

The shell middle part 120 has a second front conical end 122A that diverges around the first front conical end 172A of the motor case 172, and a second aft conical end 122B that converges around the first aft conical end 172B of the motor case 170. The shell middle part 120 has a second middle part 122C that is cylindrical and surrounds the first middle portion of the motor case 170.

The identified contours of the shell 100 and the motor case 172 provide for desired airflow dynamics through the ACM 33 and between the compressor 160, the motor 17 and the turbine 180.

Figure 5:
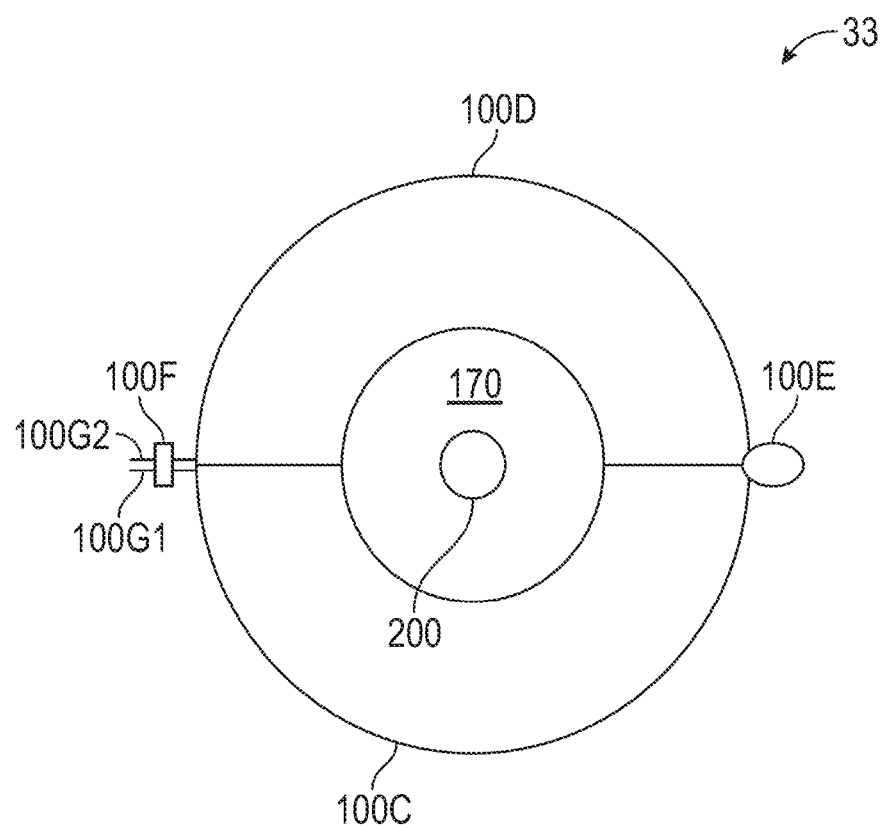
FIG. 5 is a cross section of the ACM along lines 5-5 in FIG. 4 and shows segments of a shell surrounding the ACM according to an embodiment.

As shown in FIG. 5, the outer shell 100, end to end, may be formed of two unitary half-shell members 100C, 100D. The half-shell members 100C, 100D may be additively manufactured and coupled to each other by one or more of hinges 100E and fasteners 100F, e.g., securing flanges 100G1, 100G2 formed on mate-faces of the half-shell members 100C, 100D. Components of the ACM 33, such as the heat motor 170 and the hollow shaft 200 shown in FIG. 4, may be installed and within the shell halves, which may then be closed around the components. The shell halves 100C, 100D may be later opened to service the components.

Accordingly, the embodiments provide a unitary ACM and CAC, rather than utilizing separate subsystems for an ECS. This configuration reduces inefficiencies that may be otherwise introduced by the utilization of separate subsystems for the ECS. The disclosed configuration also provides containment around the compressor and turbine stages. A further benefit is reduced drag that is otherwise added to the aircraft by utilization of the ACM.

The terminology used herein is for the purpose of describing particular embodiments only and is not intended to be limiting of the present disclosure. The term "about" is intended to include the degree of error associated with measurement of the particular quantity and/or manufacturing tolerances based upon the equipment available at the time of filing the application. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An air cycle machine (ACM),
comprising: a motor having a front end and an aft end; a compressor coupled to the front end of the motor; a turbine coupled to the aft end of the motor; a shell having a shell front part that surrounds the compressor and defines a shell inlet, a shell aft part that surrounds the turbine and defines a shell outlet, and a shell middle part that surrounds the motor, wherein an outer flow passage is defined within the shell, surrounding the compressor, the motor and the turbine; a shaft extending between the compressor and the turbine to define a shaft front end that is coupled to the compressor, and a shaft aft end that is coupled to the turbine; and the motor includes a rotor that is mounted to the shaft, and wherein the motor has a motor case that includes a first front conical end that diverges aft of the shell front part, a first aft conical end that converges aft toward the shell aft part, and first middle portion that is cylindrical; and the shell middle part has a second front conical end that diverges around the first front conical end of the motor case, a second aft conical end that converges around the first aft conical end of the motor case, and a second middle portion disposed around the first middle portion of the motor case and is cylindrical.

2. The ACM of claim 1, wherein the compressor is an axial compressor.

3. The ACM of claim 1, wherein the turbine is an axial turbine.

4. The ACM of claim 1, wherein the turbine comprises a turbine high pressure stage and a turbine low pressure stage that is aft of the turbine high pressure stage.

5. The ACM of claim 1, wherein the compressor includes a compressor low pressure stage and a compressor high pressure stage that is aft of the compressor low pressure stage.

6. The ACM of claim 5, wherein the compressor low pressure stage is a cabin air compressor.

7. The ACM of claim 4, wherein
the shell front part has a first forward portion surrounding the compressor low pressure stage and a first aft portion surrounding the compressor high pressure stage.

8. The ACM of claim 7, wherein the first forward portion of the shell front part diverges toward the first aft portion of the shell front part.

9. The ACM of claim 7, wherein the first aft portion of the shell front part converges toward the shell middle part.

10. The ACM of claim 4, wherein
the shell aft part has a second front portion surrounding the turbine high pressure stage and a second aft portion surrounding the turbine low pressure stage.

11. The ACM of claim 7, wherein the second forward portion of the shell aft part diverges toward the aft portion of the shell aft part.

12. The ACM of claim 7, wherein the second aft portion of the shell aft part converges aft of the front portion of the shell aft part.

13. The ACM of claim 1, wherein:
the shaft is a hollow shaft and defines and a shaft passage extending between the shaft front and aft ends;
the shaft aft end defines a shaft inlet and the shaft front end defines a shaft outlet; and
the shaft provides for backflow from the turbine to the compressor, via the shaft inlet and outlet, for cooling of the motor.

14. The ACM of claim 13, wherein the shaft inlet is an axial aperture.

15. The ACM of claim 13, wherein the shaft outlet is an axial aperture.

16. The ACM of claim 15, wherein:
the turbine comprises a turbine high pressure stage and a turbine low pressure stage that is aft of the turbine high pressure stage; and
the shaft inlet is a radial aperture disposed at the turbine low pressure stage.

17. The ACM of claim 1, wherein the shell, end to end, is formed of two unitary half-shell members, coupled to each other by one or more of hinges and fasteners.

* * * * *